Oct. 27, 1959  J. PALMER, JR  2,910,312
CLOSURE MEANS
Filed June 27, 1955  2 Sheets-Sheet 1
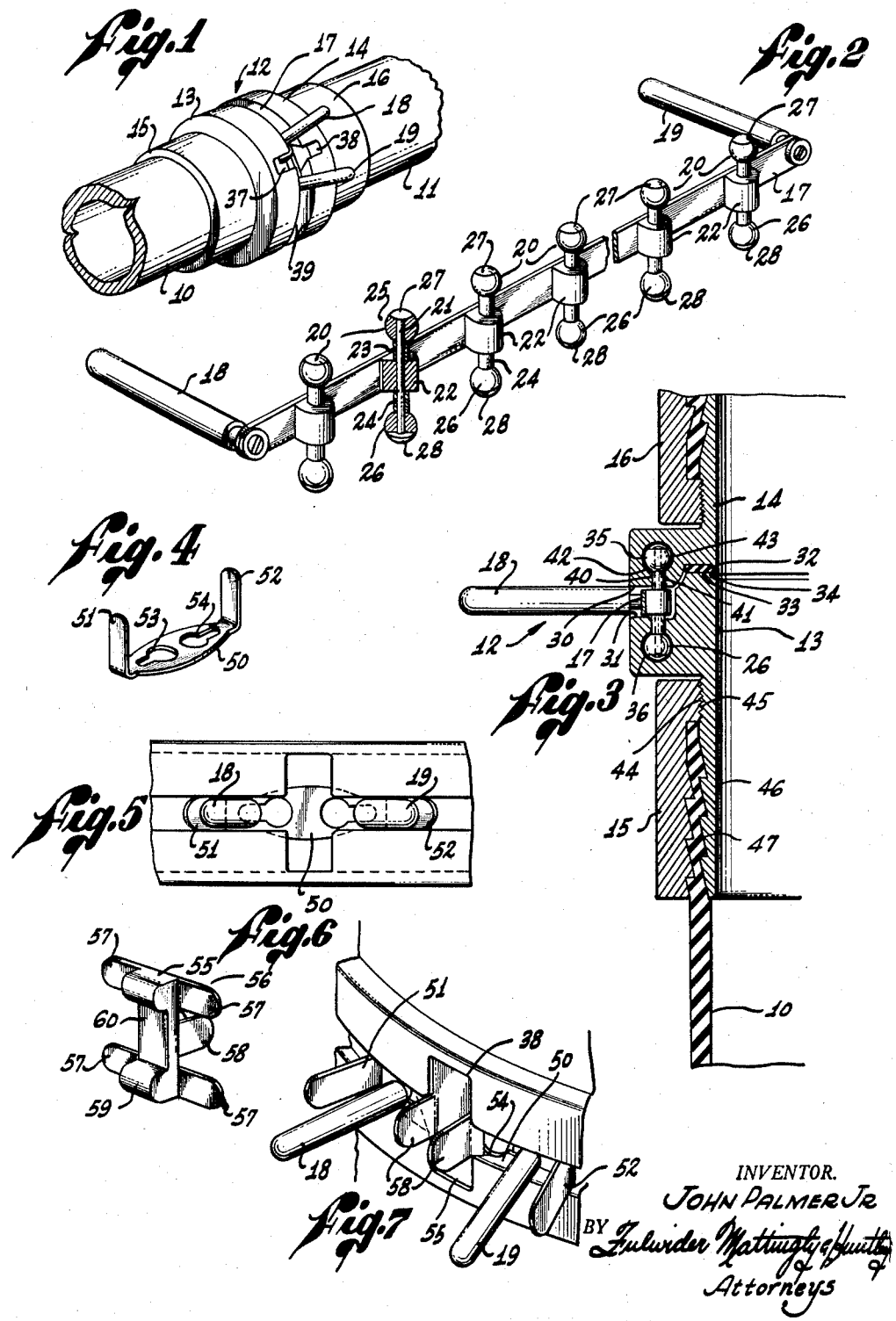
INVENTOR.
JOHN PALMER JR
BY *Fulwider Mattingly & Huntley*
Attorneys Oct. 27, 1959 J. PALMER, JR 2,910,312
CLOSURE MEANS
Filed June 27, 1955 2 Sheets-Sheet 2
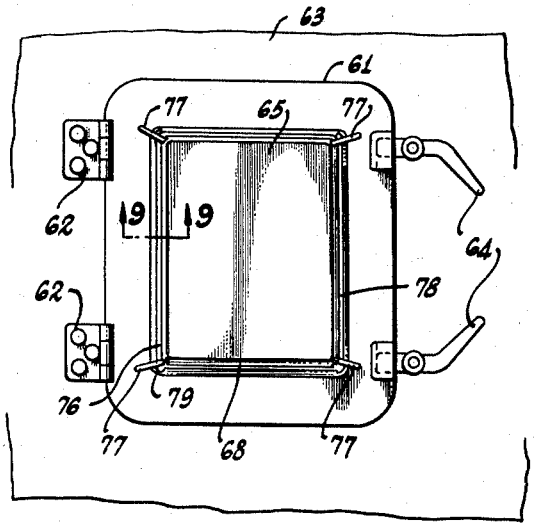
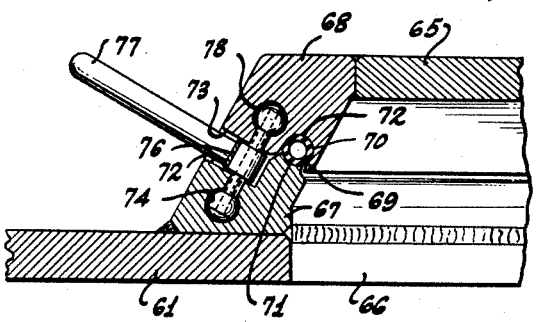
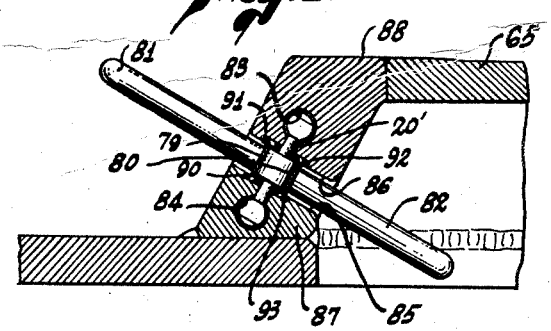
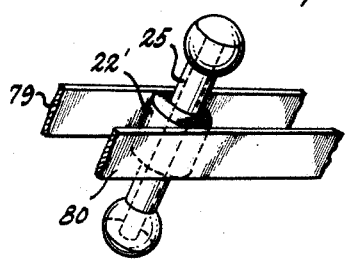
INVENTOR.
JOHN PALMER JR.
BY
Attorneys United States Patent Office 2,910,312
Patented Oct. 27, 1959

2,910,312

CLOSURE MEANS

John Palmer, Jr., Santa Barbara, Calif.

Application June 27, 1955, Serial No. 518,008

9 Claims. (Cl. 285—365)

This invention relates to means for joining two mating mechanical parts and more particularly to a closure means for this purpose which can be easily and repeatedly opened or closed, and which provides a very strong connection, which may be air or water tight. The invention may be employed in constructing readily releasable coupling for connecting hoses or other conduits. The device is by no means restricted to the coupling of conduits, however; it may be used instead of a row of bolts or screws in attaching any mating parts, for example in closing engine cowlings or other housings, for the closure of manholes and bulkheads, for mounting parts which it is desired to have quickly demountable.

This invention is designed to provide a quick opening and closure means analogous to the slide fasteners used with fabrics but adapted to uses which require great strength, or require tight seals, and particularly for joining mechanical parts of metal and other heavy or stiff materials. Ordinarily, heavy metal parts are fastened together by bolts or screws or other such fasteners and, when it is desired to dis-assemble them, it is necessary to make use of wrenches, screwdrivers, or other tools. Both dis-assembly and re-assembly involve considerable tedious work and the numerous bolts, nuts, screws or other fasteners must be carefully stored during dis-assembly lest some of them be lost. The threaded fasteners are not only inconvenient because of the time consumed in tightening or untightening them, but frequent opening and closure tends to result in damage to screw slots or to the faces and corners of nuts or bolt heads, especially if tools of the wrong size are used. Sometimes it becomes necessary to replace the threaded fasteners. In other cases, such damaged threaded fasteners may make very difficult any attempt to remove them. In some applications, such as safety doors and hatches, delays encountered with a multiplicity of threaded fasteners may present a serious problem in case of an emergency.

It is a major object of this invention to provide a closure or assembly means adapted to be easily and repeatedly opened and closed.

It is a further object to provide said rapid closure means in a form which requires no tools for operation, so that the closure can be readily opened or closed by hand.

Still another object of the invention is to provide a closure means of great strength having points of connection disposed at spaced distances all along the edges which are being joined. It is desired to accomplish this object without the use of a large number of separate parts or small pieces subject to being easily lost in handling.

A further object of the invention is to provide a closure means which accomplishes sealing by pulling the mounted parts together and placing a gasket or sealing means under slight compression.

Finally, it is an object of the invention to provide a rapid closure system which does not require parts made with high precision and which can be cheaply manufactured in quantity.

The invention employs a pair of mating coupling part members, one on each of the two parts to be joined. On their adjacent faces, each of the coupling members is longitudinally slotted, each slot being partly closed by internal shoulders along each side of the slot opening in order to provide in the bottom of each slot a partially enclosed channel. The two coupling members may be joined along a joinder line, when placed in mating position, by manually pulling along the slots a carrier strip, preferably flexible, to which are attached a row of connecting pins of unique design, adapted to ride in said slots and seat in said channels therein in such a manner as to effect closure between the coupling members. Preferably, the coupling members are provided with a pair of mating surfaces adapted to receive between them a gasket or other sealing means upon which a slight pressure is exerted when closure is made, so as to make the coupling gas or liquid tight.

The construction and operation of the invention will be described in detail in connection with the accompanying figures, in which:

Figure 1 is a perspective view of a hose coupling constructed according to the present invention;

Figure 2 is a perspective view of a carrier strip carrying a row of connecting pins which serve as the connection between coupled or assembled parts;

Figure 3 is a longitudinal sectional view taken through one side of the coupling of Figure 1;

Figures 4, 5, 6, and 7 are perspective views of accessories suitable for closing the strip entrance in the coupling members;

Figure 8 is a front view of a hatch way door in which an emergency escape panel is mounted by means of a closure designed in accordance with the present invention;

Figure 9 is a sectional view taken transversely through the adjoining edges of the escape panel and escape opening as indicated in Figure 8 by the arrows 9—9; and Figures 10 and 11 illustrate an alternative closure design for the escape panel of Figure 8.

In Figure 1, a pair of hoses 10 and 11 are shown coupled by means of a coupling indicated generally by the numeral 12 and comprised of a pair of mating coupling members 13 and 14, seen facing each other in coupled position, a pair of hose attachment rings 15 and 16, and a carrier strip 17 shown in Figure 2 as it appears when removed from coupling 12. A single carrier strip may be employed around the entire circumference of the coupling; it is preferable however, to use two carrier strips one for each half of the circumference of the coupling.

Carrier strip 17 is preferably a flexible steel tape or the like equipped at each end with sturdy handles 18 and 19. Spaced along carrier 17, ordinarily at regular intervals is a row of connecting pin assemblies 20. The parts comprising each pin assembly are seen in the assembly shown in section in which a relatively long connecting pin 21, transverse to tape 17, is rotatably mounted in a spacer 22 which is in the form of a thick wall cylinder having an axial length corresponding to the space between the adjacent faces of the coupling members 13 and 14. Pin assemblies 20 are attached to carrier strip 17 by welding or otherwise attaching spacer 22 to the strip. At each end of spacer 22 the projecting ends of pin 21 pass through rolling sleeves 23 and 24 and enlarged bearing members 25 and 26. Preferably, bearing members are ball shaped, but they may also be shaped as cones, half spheres, ellipsoids, etc. The ends of pin 21 are enlarged into heads 27 and 28, preferably by peening or forging after assembly.

In Figure 3, a portion of a longitudinal section through a coupling 12 and hose 10 shows the manner in which couplings 13 and 14 meet at their adjacent surfaces 30 and 31, respectively. The inner portions of adjacent surfaces 30 and 31 are formed with a mating recess 32 and shoulder portion 33 adapted to engage the surfaces of the gasket seal 34, when members 13 and 14 are coupled. The outer portions of adjacent faces 30 and 31 are separated from each other by a space slightly greater than the axial length of spacer 22, and are provided with annular slots 35 and 36, which are adapted in cross section to receive pin assemblies 21, and which extend lengthwise entirely around the circumference described by faces 30 and 31.

As seen in Figure 1, coupling members 13 and 14 are provided with entrance slots 37 and 38 at least one point of their circumference to permit the introduction of carrier strip 17 together with its roll of pin assemblies 20. Preferably, two carrier strips extending 180° around the couplings are employed, and a corresponding pair of entrance slots are provided 180° away from slots 37 and 38.

The gap 39 appearing between the outer portions of adjacent faces 30 and 31 of coupling members 13 and 14 is sufficiently great to permit the free movement therethrough of handles 18 and 19 when carrier strip 17 is inserted for closure, or removed for disconnecting coupling 12.

As seen in the cross sectional view of Figure 3, slots 35 and 36 are reduced in width near their entrances. In slot 35, for example, the entrance portion is flanked by internal annular shoulders 40 and 41, which provide flat surfaces facing each other, along which rolling sleeve 23 rolls when carrier strip 17 is being inserted or removed. The inner portions of internal annular shoulders 40 and 41 provide bearing surfaces 42 and 43 which engage the under side of ball 25 when closure is effected.

The opposite slot 36 is shaped in the same manner as slot 35 so as to provide a similar enlarged channel along its bottom, and shoulders for engaging ball 26. Preferably, the distance between the bearing surfaces in slots 35 and 36 engaged by pin assemblies 20 is sufficiently short to place sealing gasket 34 under compression when carrier strips 17 are pulled into closure position. At the same time, there should be sufficient clearance between spacer 22 and faces 30 and 31 so that carrier strip 17 can be inserted and removed freely without binding engagement of the non-rotating spacer 22.

Hose attachment ring 15 is internally threaded at 44 and adapted to be threaded on external threads 45 on the extending sleeve portion 46 of coupling member 12.

The space between hose attachment ring 15 and coupling member sleeve 46 is wedge shaped in cross section, and serrated with internal circumferential teeth 47. Thus, when hose attachment ring 15 is tightened on threads 44 and 45, hose 10 is tightly gripped and sealed. Hose attachment ring 16 and coupling member 13 grip hose 11 in like manner.

In most couplings, strip or strips 17 will tend to remain in place because of frictional engagement between the bearing members 25 and 26 on the ends of connecting pin assemblies 20, and the bearing surfaces in slots 35 and 36. However, if desired, strip entrance 38 may be sealed and the adjacent ends of the closure strip 17 may be locked together by means of the auxiliary pieces illustrated in Figures 4 and 6, and shown in Figures 5 and 7, respectively. Figure 4 shows a connecting link 50, which is a sheet metal stamping with two upturned finger grips 51 and 52 and a pair of T-shaped holes 53 and 54 in the central portion of the link. T-shaped holes 53 and 54 are adapted to receive handles 18 and 19 so that connecting link 50 may be slipped over said handles as seen in Figure 5 thus connecting the two ends of a pair of carrier strips 17 (or the two ends of a pair of carrier strips, if two or more strips are used). Figure 6 shows an entrance closure bracket 55 which is comprised of a sheet metal stamping 56 having four spring fingers 57 and a pair of finger grips 58. Attached to the face of metal stamping 56 opposite finger grirps 58 is a rectangular spacer 59 the middle portion 60 of which is recessed to fit over connecting link 50, in a position transvers thereto. Figure 7 is a view of strip entrance 38 with closure bracket 55 snapped into position over connecting link 50.

Figure 8 is a diagrammatic illustration of the bulkhead door 61 mounted on hinges 62 in bulkhead 63 and closed by hinged dogs 64. The middle of bulkhead door 61 is provided with a rectangular escape opening seen covered by rectangular escape panel 65 in Figure 8. Escape panel 65 is attached or detached to bulk head door 61 by means of a quick closure strip designed in accordance with this invention. If strain or distortion of bulkhead 63 causes bulkhead door 61 to jam, the closure means to be described hereinafter permits quick and easy manual removal of escape panel 65.

One type of closure means for escape panel 65 is illustrated in the sectional view of Figure 9, which is taken in the direction of the arrows 9—9 in Figure 8. Escape panel 65 is seen in section covering escape opening 66 in bulkhead door 61. Escape opening 66 is framed by a steel frame 67, seen in section in Figure 9, which is welded to bulkhead door 61 around the periphery of escape opening 66. Escape panel 65 is likewise bounded by a frame 68, seen in cross section in Figure 9. Frames 67 and 68 serve the same function in the emergency escape opening 66 as was served by coupling members 13 and 14 in the coupling of Figure 1. As seen in the sectional view in Figure 9, the coupling frame members 67 and 68 seat at 69 on a suitable gasket seal 70; in the case illustrated, the sealing means is shown to be somewhat like a strip of rubber hose which is slightly compressed between mating surfaces 71 and 72 of coupling frames 67 and 68. The outer portion of coupling frames 67 and 68 are provided at their adjacent surfaces at 73 with partially enclosed recess channels 74 and 75 which receive a closure strip 76 in the same manner as carrier strip 17 was received in channels 35 and 36 of coupling members 12 and 13. Carrier strip 76 is provided with a suitable handle 77. As seen in Figure 8, escape panel 65 may be closed by means of two closure strips 76 and 78, running along the vertical left and right edges respectively of escape opening 66. Strip entrances 79 are provided at each corner of escape opening 66 by slots in the corners of coupling frames 67 and 68. It will be understood, of course, that, if desired, four closure strips 76 might be employed, one along each edge of escape panel 65.

Figure 10 shows in section an alternative form of closure for escape panel 65. It differs from the closure of Figure 9 in that it may be opened from either side of bulkhead door 61. The carrier strip 79 of the embodiment of Figure 10 is substantially different from those of Figure 1 and Figure 9, as seen in the small section of Figure 11. The connecting pin assemblies 25 are the same as connecting pin assembly 20 but spacer 22' is attached at opposite faces to two separate carrier strips 79 and 80. Strip 79 is provided with handles at each end such as handle 81, which is mounted on strip 79 and projects outward from bulkhead door 61, so as to be visible as viewed in Figure 8. Strip 80 bears handles, such as handle 82, which project inward from bulkhead door 61. Carrier pin assemblies 25 ride in channels 83 and 84 very much like those of Figures 3 and 9.

The gasket seal arrangement, however, is very different from previous embodiments since the gaskets must bear on carrier strips 79 and 80 and spacers 22' rather than on adjoining faces of 85 and 86 of coupling frames 87 and 88. This results in some resistance to the introduction of carrier strip, and to its withdrawal, but this disadvantage may be more than outweighed by accessability from both sides of escape panel 65. The adjacent faces 85 and 86 of coupling frames 87 and 88 are longitudinally recessed on each side of channel recesses 83 and 84 so as to provide space for gasket strips 90, 91, 92 and 93.

Three embodiments of the invention have been disclosed, but the broad idea will obviously comprehend many embodiments not described herein. For example, the carrier strip is preferably flexible, but one modification of the device might employ rigid bar carrier strips. The connecting pin assemblies 20 preferably include rolling sleeves 23 and 24 and rolling bearing members 25 and 26 but a cheap and simple version of the closure means may dispense with the rolling parts and replace pin assembly 20 with a single integral connecting member of proper shape but without relative rotatability of different parts.

The invention is not restricted to the coupling members shown or to the particular shape of connecting pin; it is only necessary that the coupling members provide bearing surfaces for a row of connecting pins and that the pins be suitable for attachment at various intervals to a carrier strip and for engaging the coupling members in such manner as to bring them together.

While the invention finds its best use in the coupling of mechanical parts, it will be obvious that relatively flexible or segmented coupling members might be employed for joining the edges of flexible sheets of woven metal or cloth.

I claim:

1. A closure means for releasably coupling two mating mechanical parts along a line of joinder, which includes: walls on said parts along said line of joinder defining a pair of confronting slots, each of said slots having a relatively narrow opening and being adapted in its interior transverse cross section to provide a bearing surface to engage and grip a bearing member on one end of a pin connecting said two parts; walls parallel with said slots on each of said parts and adapted to mate with one another, said mating walls when engaged maintaining the openings of said slots in spaced apart relationship to provide a clearance space therebetween; compressible sealing means disposed between said mating walls; a flexible carrier strip adapted to follow the contour of said line of joinder; spacer elements attached at spaced intervals to said carrier strips and adapted to pass freely in said clearance space between adjacent faces of said coupling members in the region of said slots; a plurality of connecting pins mounted in said spacer elements transversely to said carrier strip; and a bearing member on each end of said connecting pins and adapted to be received in said slots and to engage the inner surfaces thereof, thereby permitting said connecting pins to be drawn laterally through said slots to effect closure of said two mating parts, the spacing between the pair of bearing members on each pin being less than the distance said bearing surfaces of said slots are held apart by said sealing means when said sealing means is uncompressed whereby said closure of said parts effects compression of said sealing means.

2. A closure means for attaching a first part to a second part, which includes: a first coupling member along a peripheral edge of said first part and a second coupling member on said second part mating with said first coupling member; a compressible sealing member between said coupling members and adapted to be compressed by the joinder of said first and second coupling members; walls in said first coupling member defining a slot running parallel with said compressible sealing means, said slot having an internal longitudinal shoulder restricting its openings; walls in said second coupling member defining a slot similar to and confronting said first coupling slot, said coupling slots being spaced from each other by the mating of said first and second coupling members; a flexible carrier strip adapted to be drawn along said periphery of said first mechanical part within said space between said coupling members in the region of said slots; a plurality of spacers attached to said flexible carrier strip and spaced at points along the length thereof and adapted to pass freely with said carrier strip along the peripheries of said mechanical parts in said space between said first and second coupling slots; pin members mounted in said spacer members, transversely to said flexible strip, and extending to each end into said coupling slots; ball members, rotatably mounted on the ends of said pin members, and adapted to roll in the inner portion of said coupling slots, and engage the inner surfaces of said internal shoulders so as to place said pin members in tension when drawn into position in said slots by means of said flexible strip; and an entrance into each of said slots formed in a wall surface of said part on the opposite side of said slot from said sealing member, said pair of entrances when aligned permitting insertion of said pin and ball members into said slots.

3. A closure means for releasably coupling first and second tubular coupling members to each other, which means includes: an endless sealing member fitting between adjacent mating surfaces of said first and second coupling members, said sealing member being placed in compression between said first and second coupling members when said members are coupled; walls in said first coupling member defining an endless slot around said sealing member, said slot being shaped in transverse cross section to engage one enlarged end of a connecting pin, while permitting said pin to be moved laterally through said slot; walls in said second coupling member defining a corresponding slot around said sealing member, said slots being disposed with their transverse cross sections in alignment with each other and with their openings separated by a gap which remains constant throughout their length; an elongated flexible carrier strip adapted to fit between said slots when said coupling members are in coupling position; a plurality of connecting pins mounted on said carrier strip, transversely to the length of said strip, and at spaced intervals along it; rotating members on the ends of said connecting pins projecting into said slots and enlarged to engage the interior surfaces of said slots to hold said coupling pins in tension when said coupling members are coupled; walls in said first coupling member defining a passage for the entrance of said pin and the rotatable members thereon into said first coupling slot on the side of said slot opposite to said sealing member; walls in said second coupling member defining a similar passage for the entrance of the opposite end of said connecting pin into said second coupling slot; and handle means on said flexible carrier strip projecting from said gap between said first and second coupling members, and providing an accessible manual grip for drawing said carrier strip, bearing said connection pins, into coupling position with the ends of said connecting pins engaging the interior surfaces of said first and second coupling slots.

4. A closure means as described in claim 3, in which said flexible carrier strip is comprised of at least two separate sections capable of being independently inserted or withdrawn from the coupling slots.

5. In a pair of members adapted for registration with one another, a closure means comprising: complementary confronting elongated surfaces formed on said members, each of said surfaces being formed with a slot extending longitudinally thereof and confronting the slot of the other surface, each of said slots having an internal longitudinally extending shoulder restricting its opening, each of said surfaces on opposite sides of the opening into the slot thereof being formed with a recess extending longitudinally of and joining a side of said slot; a plurality of gaskets each of which occupies one of said recesses of said confronting faces; a pair of carrier strips interconnected by a plurality of spacers mounted therebetween and adapted to maintain said strips spaced apart a distance corresponding to the distance between a pair of gaskets on the same surface; a plurality of connecting pins mounted in said spacers to extend transversely of said strips and adapted for reception of the opposite ends thereof in said slots, said pins having enlarged opposite ends adapted to engage said shoulders of said slots, the spacing between said enlarged ends being adapted for drawing said pair of members together to seat said gaskets on said strips; a first handle means projecting from one of said strips and adapted to pass freely in the space between the confronting surfaces of said members on one side of said slots; and a second handle means on the other of said strips on the side opposite from said first handle means and adapted to pass freely in the clearance space between said confronting surfaces whereby said strip can be moved along said slots from either side of said strip.

6. A closure means for releasably coupling a first part to a second part, which means includes: a male member disposed along a peripheral edge of said first part and a female member disposed along a peripheral edge of said second part and adapted for mating with said male member; a resiliently deformable sealing member adapted to be disposed between and along said mating members; a slot in each of said mating members running parallel with said sealing member that is interiorly enlarged to engage and hold one enlarged end of a connecting pin while permitting said pin to move laterally through said slot, said slots opening into confronting faces of said mating members that are held spaced apart, when said mating members are joined, to permit passage of a handle means between said confronting faces; a flexible carrier strip; a plurality of spacer members attached to said flexible carrier strip and spaced at points along the length thereof, said strip and spacers being adapted for passage through the space between said confronting faces of said mating members; pin members mounted in said spacer members transversely to said flexible strip, each of said pin members being enlarged at each end to complementarily engage said slots while being moved laterally through said slots to thereby couple said first and second parts, the spacing between said enlarged ends of said pins being adapted for inducing compression of said sealing member; and outwardly protruding handle means on said flexible carrier strip for drawing said strip along said slots with the ends of said connecting pins engaging said slots.

7. Fluid-sealing closure means comprising: a pair of coupling members having confronting end surfaces, each of said end surfaces having an elongated narrow mouth slot opening thereinto that has at least one entrance opening formed in one wall of said member with said slots and said entrances of said pair of members being in alignment, said members along their opposite walls having complementary matingly engageable portions formed in said confronting surfaces thereof; compressible sealing means disposed along and between said complementary portions of said coupling members; a plurality of connecting pins each of which has enlarged opposite-end portions adapted for reception into said slot through only said entrances, the enlarged end portions of said pins being adapted for reception into and seating on enlarged inner end portions of said narrow-mouth slots with the spacing between the opposite-end portions of said pins being adapted to compress said sealing means between said confronting surfaces when said pin ends are seated in said slots; and an elongated flexible member interconnecting said pins at spaced intervals to insert and withdraw said pins through said slots.

8. Fluid-sealing closure means comprising: a pair of tubular coupling members adapted for coaxial registration thereof and having confronting end faces formed with confronting slots extending continuously therearound, each of said slots in transverse cross section defining an internal shoulder restricting its opening; a continuous seal element made of a compressible material and adapted for coaxial seating on said confronting faces alongside said slots and adapted to yieldably resist movement of said confronting faces into contact with one another; an elongated flexible carrier strip adapted for passage through the space between said confronting faces of said members; and a plurality of connector pins mounted on and extending transversely of said strip at spaced intervals therealong, the opposite-end portions of said pins being enlarged for seating on the internal shoulders of said slots, said pins being insertable into said slots through aligned entrances of said slots formed in the outer wall surfaces of said members, the spacing between said end portions being adapted to draw said members towards one another to compress said seal element between said confronting faces, said pins being adapted to be placed in tension between said internal shoulders.

9. A device as set forth in claim 8 in which said strip is of substantially the same length as said slots and has outwardly extending handles affixed to both ends thereof that are positioned adjacent said entrances when said members are coupled and in which a connecting link is removably engaged with said handles.

References Cited in the file of this patent

UNITED STATES PATENTS

| | | |
|---|---|---|
| 791,332 | Duval | May 30, 1905 |
| 964,578 | Stephens | July 19, 1910 |
| 992,022 | Matthews | May 2, 1911 |
| 1,020,839 | Niesen | Mar. 19, 1912 |
| 1,734,479 | Glidden | Nov. 5, 1929 |
| 2,521,174 | Krupp | Sept. 5, 1950 |
| 2,746,114 | Williams | May 22, 1956 |

FOREIGN PATENTS

| | | |
|---|---|---|
| 69,404 | Austria | July 26, 1915 |

UNITED STATES PATENT OFFICE

CERTIFICATE OF CORRECTION

Patent No. 2,910,312 October 27, 1959

John Palmer, Jr.

It is hereby certified that error appears in the printed specification of the above numbered patent requiring correction and that the said Letters Patent should read as corrected below.

Column 6, line 2, for "to each" read -- at each --.

Signed and sealed this 12th day of April 1960.

(SEAL)
Attest:

KARL H. AXLINE
Attesting Officer

ROBERT C. WATSON
Commissioner of Patents